UNITED STATES PATENT OFFICE.

WILLIAM H. VAN KEUREN, OF WINONA, MINNESOTA.

MIXED PAINT.

SPECIFICATION forming part of Letters Patent No. 322,659, dated July 21, 1885.

Application filed June 9, 1884. (Specimens.)

*To all whom it may concern:*

Be it known that I, WILLIAM H. VAN KEUREN, of Winona city, in the county of Winona and State of Minnesota, have invented a new and Improved Paint Powder or Material, of which the following is a full, clear, and exact description.

My invention consists in the production, as a new article of manufacture, trade, and commerce of a paint powder or material by the reduction to powder of a certain mineral known as "pipe-stone," found in certain parts of Minnesota and Dakota, and which mineral has never before been used for any analogous purpose.

My invention also includes a paint powder or material made from fused pipe-stone reduced to powder. Such paint powder or material, when mixed with oil, as other paint powders are mixed, makes, as I have discovered, a paint of superior color and body.

The mineral as dug from the earth is of a soft and pliable nature, and in such condition may be readily cut by the knife, and derives its name of pipe-stone from the fact of its having been thus fashioned into pipes. Upon exposure to the air, however, it becomes very hard. From two different analyses made I find that the constituents of this mineral consist, mainly, of silica, from about 52.80 to 53.50 parts; alumina, from about 35.83 to 38.29 parts; oxide of iron, from about 7.87 to 2.33 parts; potassa and soda, from about 0.25 to 0.30 parts; carbonate of lime, from about 0.00 to 0.92 parts; water, from about 3.20 to 4.40 parts. Taking this mineral I have allowed it to harden by exposure to the air, and then reduced it to a fine powder, in which condition when mixed with oil it makes a fine red-colored paint, and by heating it to a red heat before reducing it to powder and subsequently mixing it with oil a red paint of darker color. I have also found that by fusing it in a crucible before grinding or reducing it to a powder, and then mixing it with oil it makes a good drab-colored paint. The oil of course may vary both in quantity and description, according to the consistency and quality of the paint required.

The mineral may be ground in oil to a paste-like consistency, and be exposed for sale as white lead is sold.

By the production of this paint powder or material from pipe-stone ready for mixture with a suitable vehicle to make paint, I am enabled to place before the public a new article of manufacture, trade, and commerce which will be found highly valuable, and which pipe-stone has never before been used for or worked into. A paint made with this powder both spreads well and is durable.

Having thus described my invention, I claim as new and desire to secure by Letters Patent—

A paint-powder consisting of silica, alumina, oxide of iron, potassa, soda, and carbonate of lime in about the proportions specified.

WILLIAM H. VAN KEUREN.

Witnesses:
D. E. VANCE,
HELMER H. LEE.